United States Patent
Shiromaru et al.

(10) Patent No.: US 6,860,934 B2
(45) Date of Patent: Mar. 1, 2005

(54) PROCESS FOR THE PRODUCTION OF β TYPE COPPER PHTHALOCYANINE PIGMENT

(75) Inventors: Osamu Shiromaru, Tokyo (JP); Yuusaku Ide, Tokyo (JP); Toshio Oshiba, Tokyo (JP); Takuya Kotani, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/864,324

(22) Filed: Jun. 10, 2004

(65) Prior Publication Data

US 2004/0250734 A1 Dec. 16, 2004

(30) Foreign Application Priority Data

Jun. 13, 2003 (JP) ........................................ 2003/168807

(51) Int. Cl.$^7$ .................... C09B 67/12; C09B 47/04; C09B 67/04; C07D 487/22
(52) U.S. Cl. ........................ 106/412; 106/410; 106/411; 106/413; 106/31.78; 540/122; 540/140; 540/141
(58) Field of Search ............................ 106/31.78, 410, 106/411, 412, 413; 540/122, 140, 141

(56) References Cited

U.S. PATENT DOCUMENTS

| | | | |
|---|---|---|---|
| 2,999,862 A | | 9/1961 | Geiger .................... 540/141 |
| 3,057,872 A | * | 10/1962 | West ...................... 540/129 |
| 3,267,116 A | * | 8/1966 | Braun ..................... 540/136 |
| 3,954,795 A | | 5/1976 | Jackson ................... 540/141 |
| 4,024,154 A | * | 5/1977 | Jackson ................... 540/141 |
| 4,104,277 A | * | 8/1978 | Langley ................... 540/141 |
| 5,175,282 A | | 12/1992 | Roth et al. ............... 540/141 |
| 5,281,268 A | * | 1/1994 | Ide et al. ................. 106/410 |
| 5,284,511 A | * | 2/1994 | Rolf et al. ................ 106/410 |
| 5,427,616 A | * | 6/1995 | Tsuji et al. ............... 106/412 |
| 5,772,750 A | * | 6/1998 | Tomiya et al. ............. 106/413 |
| 5,776,237 A | * | 7/1998 | Tomiya et al. ............. 106/412 |
| 5,831,083 A | * | 11/1998 | Ohno et al. ............... 540/141 |
| 5,942,028 A | * | 8/1999 | Tomiya et al. ............. 106/31.78 |
| RE37,191 E | * | 5/2001 | Tomiya et al. ............. 106/412 |
| 6,306,938 B1 | | 10/2001 | Mathers et al. ............ 524/88 |
| 6,379,450 B1 | * | 4/2002 | Willis et al. .............. 106/412 |

FOREIGN PATENT DOCUMENTS

| | | |
|---|---|---|
| EP | 000422907 A2 * | 4/1991 |
| EP | 000672728 A1 * | 9/1995 |
| EP | 0 803 545 | 10/1997 |
| EP | 000808878 A2 * | 11/1997 |
| JP | 62-72758 A * | 4/1987 |
| JP | 9-67525 | 3/1997 |
| JP | 2001-181525 | 7/2001 |

OTHER PUBLICATIONS

Patent Abstracts of Japan, vol. 1996, No. 03, Mar. 29, 1996 –Abstract of JP 7 310024, Nov. 28, 1995.
Patent Abstracts of Japan, vol. 0152, No. 56 (C–0845), Jun. 28, 1991 –Abstract of JP 3 084067 A, Apr. 9, 1991.

* cited by examiner

*Primary Examiner*—Anthony J. Green
(74) *Attorney, Agent, or Firm*—Wenderoth, Lind & Ponack, L.L.P.

(57) ABSTRACT

A process for the production of a β type copper phthalocyanine pigment having an average primary crystal diameter of 80±40 nm and a primary crystal aspect ratio of 2.0±1.0 and having a crystallite diameter of 22±5 nm in the direction perpendicular to a monoclinic β (200) plane, a crystallite diameter of 27±5 nm in the direction perpendicular to a β (001) plane and a crystallite diameter of 15±5 nm in the direction perpendicular to a β (010) plane, which process comprises, dry-milling a crude copper phthalocyanine having a purity of 97 to 100% and a primary crystal diameter of 0.5 to 100 μm at 180 to 50° C., to prepare an α/β mixed crystal type copper phthalocyanine having an a ratio of 5 to 35%, and treating the dry-milled product in a water-miscible organic solvent.

4 Claims, No Drawings

PROCESS FOR THE PRODUCTION OF β TYPE COPPER PHTHALOCYANINE PIGMENT

FIELD OF THE INVENTION

The present invention relates to a process for the production of a β type copper phthalocyanine pigment according to a dry-milling method.

Prior Arts of the Invention

Generally, a copper phthalocyanine after synthesis is called a crude copper phthalocyanine, and it is formed of large particles having a primary crystal diameter of 0.5 to 100 μm. For this reason, it is impossible to directly use the above crude copper phthalocyanine as a pigment for a printing ink. The step of decreasing the size of primary crystals of the above crude copper phthalocyanine to about 100±50 nm, which is a size usable as a printing ink, is called pigmentation. There are a variety of methods for the pigmentation.

Most general is a method which is called a solvent salt milling method. In this method, a milling assistant such as a common salt and an organic solvent, which promotes the conversion of crystals to β type, are added to the crude copper phthalocyanine and the mixture is milled. A β type copper phthalocyanine pigment obtained according to the above method has an average primary crystal diameter of 80±40 nm and a primary crystal aspect ratio of 2.0±0.5, that is, the size and shape of primary crystals are uniform. The above characteristics in physical properties advantageously reflect on its aptitude, so that the β type copper phthalocyanine pigment is suitable for a printing ink in terms of fluidity and tinting strength and is thus widely used. However, the above method uses a milling assistant in an amount several times as large as that of the pigment and it uses a high boiling solvent which is a high environmental loading substance, so that numerous amounts of time and energy are required for the step of recovering the milling assistant or the organic solvent. In addition, the above method has a significant problem in that inorganic salts as a milling assistant corrode equipment, i.e., the load on the equipment is high.

In contrast, there is known a method in which the crude copper phthalocyanine is dry-milled and then the dry-milled phthalocyanine is treated with an organic solvent or the like. Since the steps of this method are simplified when compared with those of the above-mentioned solvent salt milling method, this method is very effective means for providing a low-price β type copper phthalocyanine pigment.

Crystals of a β type copper phthalocyanine converts into α type crystals, which is thermodynamically unstable, by means of a mechanical impact force such as that in dry-milling. It is known that, when a β type crude copper phthalocyanine is dry-milled at a milling temperature of 80 to 90° C., generally, the β ratio in the dry-milled copper phthalocyanine becomes 60% or more (JP-A-7-310024).

On the other hand, when the milling is carried out by a small impact force, naturally, the ratio of α type crystals can be controlled to be small. For example, JP-A-2-294365 discloses that, when the milling is carried out at a milling temperature of 100° C., the content of α type crystals in the dry-milled product is 21%. However, the milling by such a degree of impact force cannot achieve the size distribution of pigment particles obtained by the solvent salt milling method.

The solvent salt milling method is characterized by applying a powerful frictional force to a dough composed of a crude copper phthalocyanine of huge primary crystals, an organic solvent and a milling assistant.

On the other hand, the method in which the dry-milled product is treated with an organic solvent or the like is characterized in that α type crystals are converted into β type crystals and, simultaneously, a strong aggregation of fine primary crystals is deflocculated to obtain an intended dispersed particle diameter. However, it is known that primary crystals grow into a needle form in the step of converting the α type crystals in the dry-milled product into β type crystals and the aspect ratio becomes large when compared with that of the solvent salt milling method.

The method, in which the crude copper phthalocyanine is dry-milled and then treated with an organic solvent or the like, is advantageous in that the step of recovering the milling assistant required in the solvent salt milling method is unnecessary, and it is also advantageous in view of a powder treatment amount since the dry-milling is effectively carried out. On the other hand, the above method has a defect in that β type crystals are converted into α type crystals at the time of applying a mechanical force. In addition, when α type crystals are made to convert into β type crystals by the function of the organic solvent, pigment primary crystals grow into a needle form and the aspect ratio becomes larger as compared with that of the solvent salt milling method. Therefore, there arise a problem of reddening in hue based on the orientation of dispersed particles and a problem of a decrease in fluidity based on the structural viscosity. Further, there is a method in which the crude copper phthalocyanine is dry-milled in the presence of a small amount of anorganic solvent for preventing the formation of α type crystals. However, this method has a quality problem of difficulty in controlling the α ratio based on an inhomogeneous treatment and a cost problem of investment in equipment such as an explosion-proof apparatus suitable for the solvent treatment.

The present inventors have focused attention on that the α ratio in the above α/β mixed crystal type copper phthalocyanine obtained by dry-milling exerts an influence upon the aspect ratio of a pigment as an end product, and found that the aspect ratio of pigment particles obtained by treatment with an organic solvent or the like decreases with a decrease in the α ratio in the milled product.

Further, the present inventors have found that the deflocculation properties of the dry-milled product, which is a strong aggregate, depend on the α ratio and that when the α ratio is smaller than 5%, the deflocculation properties decrease extremely.

As the mechanical impact force or the milling time increases, the α ratio in the dry-milled product obtained by dry-milling increases. This phenomenon can be explained as follows. The bonding of a copper atom, which is a β type phthalocyanine center metal, to a nitrogen atom at a meso-position in an adjacent phthalocyanine molecule oriented in a longitudinal direction by the Jahn-Teller effect, is cut by mechanical stress, so that the internal energy increases. As a result thereof, the crystals convert into thermodynamically-unstable α type crystals. It is thus supposed that the crystals are again converted from α type into β type by a function which aims at thermodynamical stabilization, such as a function of heat or a nonacidic organic solvent, with releasing an enthalpy of $\Delta\beta \leftarrow \alpha = -10.8$ kJ/mol, i.e., releasing 10.8 kJ/mol.

In the dry-milling step, it is sufficient, for increasing the α ratio by decreasing the re-conversion of α type crystals into β type crystals, to jointly use a substance which suppresses a lattice contraction in the c axis direction of α type crystal. Conversely, it is inferred on the basis of crystal structure analysis, that it is sufficient for obtaining a dry-milled product having a low α ratio to use a crude copper phthalocyanine having a less amount of the substance which suppresses a lattice contraction in the c axis direction.

From the above inference, it is deduced that a dry-milled product having a low α ratio can be more easily obtained by dry-milling a high-purity crude copper phthalocyanine. This point has been verified by an experiment.

From the above theoretical backgrounds, so long as the crude copper phthalocyanine is high-purity, crystals are not easily converted into α type crystals even when a mechanical impact force is applied. Therefore, the degree of heating during the dry-milling can be decreased.

The dry-milling conditions for obtaining an α/β mixed crystal type copper phthalocyanine having an α ratio of 5 to 35% are clarified as follows. The α/β mixed crystal type copper phthalocyanine having an α ratio of 5 to 35% is obtained by dry-milling a crude copper phthalocyanine having a purity of 97 to 100% at a dry-milling temperature of 180 to 50° C., preferably 160 to 80° C.

SUMMARY OF THE INVENTION

It is an object of the present invention to provide a process for the production of a β type copper phthalocyanine pigment of which the aspect ratio of primary crystals is small.

It is another object of the present invention to provide a process for the production of a β type copper phthalocyanine pigment which retains quality, in terms of tinting strength, gloss and fluidity, equivalent to that of a pigment obtained by the solvent salt milling method and is free from defects of the solvent-salt-milling method, i.e., use of a large amount of a milling assistant and use of a high boiling solvent having a high COD value.

According to the present invention, there is provided a process for the production of a β type copper phthalocyanine pigment having an average primary crystal diameter of 80±40 nm and a primary crystal aspect ratio of 2.0±1.0 and having a crystallite diameter of 22+5 nm in the direction perpendicular to a monoclinic β (200) plane, a crystallite diameter of 27 ±5 nm in the direction perpendicular to a β (001) plane and a crystallite diameter of 155 nm in the direction perpendicular to a β (010) plane, which process comprises the step (A) of dry-milling a crude copper phthalocyanine having a purity, based on a sulfuric acid dissolution method, of 97 to 100% and a primary crystal diameter of 0.5 to 100 μm at a temperature of 180 to 50° C., to prepare an α/β mixed crystal type copper phthalocyanine having an α ratio of 5 to 35% and the step (B) of treating the dry-milled product obtained in the step (A) in a water-miscible organic solvent.

According to the present invention, there is further provided a process according to the above, wherein the water-miscible organic solvent is a liquid mixed with water.

DETAILED DESCRIPTION OF THE INVENTION

The present invention will be explained in detail hereinafter. The dry-milling of the present invention pulverizes a crude copper phthalocyanine with a milling apparatus containing milling media, such as beads, substantially without a liquid substance. The milling is carried out by utilizing a milling force or destructive force due to a collision between the milling media. The dry-milling apparatus can be selected from known milling apparatuses such as a dry-type attritor, a ball mill, a vibrating mill, etc. Further, the dry-milling may be carried out in a deoxidation atmosphere after the atmosphere in the dry-milling apparatus is replaced with the deoxidation atmosphere by supplying a nitrogen gas, etc., as required.

The dry-milling apparatus can be selected from known dry-type milling apparatuses heatable with steam, oil or the like, such as a dry-type attritor, a ball mill, a vibrating mill, etc. The milling time can be freely set depending upon the milling apparatus used or depending upon a desired milled-particle diameter. In a general dry-milling, the inside of the milling apparatus heats up, so that, in most cases, the dry-milling is carried out with cooling the temperature down to 80 to 100° C. In the present invention, a milled product having an intended α ratio is obtained by adjusting the inside temperature to 180 to 50° C., preferably 160 to 80° C. When the temperature exceeds 180° C., undesirably, an influence is exerted upon the quality of the pigment.

As the crude copper phthalocyanine, there is used a crude copper phthalocyanine having a purity, based on a sulfuric acid dissolution method, of 97 to 100%. When the above purity is smaller than 97%, a milled product having a high α ratio is obtained.

In the present invention, the purity of the crude copper phthalocyanine based on the sulfuric acid dissolution method is measured as follows.

5 g of a sample is little by little added to 100 g of 98% sulfuric acid at room temperature with stirring. After the completion of the addition, the mixture is stirred for 2 hours, and then it is poured into 500 ml of distilled water with stirring. The resultant mixture is stirred under heat at 90° C. and, 0.5 hour later, it is dried at 100° C. to a constant weight. Then, it is filtered under suction with a 17G4 glass filter, which have been weighed, and washed with water until the filtrate becomes free from acid. Then, the washed product remaining on the glass filter is dried at 100° C. to a constant weight, and then weighed. The purity can be obtained by the following expression.

Purity/%=weight after treatment×100/weight before treatment

The α ratio of the milled product is 5 to 35%, preferably 10 to 30%. A limitation is imposed upon the upper limit of the α ratio by an increase in the aspect ratio of pigment primary crystals. Further, a limitation is imposed upon the lower limit by deflocculation properties of a strong aggregate.

The solvent treatment of the milled product obtained is carried out with an organic solvent alone or a mixture of the organic solvent with water.

The kind of the solvent is a water-miscible organic solvent. Examples thereof include alcohol compounds such as isopropanol, butanol, isobutanol, ethyl cellosolve, butyl cellosolve and cyclohexanol and ketone compounds such as acetone or methyl ethyl ketone. These solvents may be used alone or in combination.

In the solvent treatment step, there may be used a bead mill such as an Eiger mill, a sand mill, a ball mill, a pearl mill ("DCP mill" supplied by EIRICH, etc.), a cosmo mill, a Z mill, a dispermat or a basket mill.

In the solvent treatment step, there may be used a media-less disperser such as a wet type jet mill ("GENUS PY" supplied by Genus, "Nanomizer" supplied by Nanomizer) or a homomixer.

In the present invention, the pigment may be treated with a resin for giving an aptitude suitable to an application thereof. This treatment can be carried out during the step (A) or the step (B). The resin may be added during the dry-milling or during the solvent treatment. The resin can be freely selected from resins suitable for a printing ink, such as rosins typified by polymerized rosin, hydrogenated rosin or disproportionated rosin, or a rosin-modified phenol resin.

In the present invention, the pigment may be treated with a surfactant for giving an aptitude suitable to an application thereof. This treatment can be carried out during the step (A) or during the step (B). The surfactant can be freely selected from nonionic surfactants, anionic surfactants and cationic surfactants so long as it is suitable for a printing ink.

When a gravure ink, an offset ink or a coating composition is produced from the copper phthalocyanine pigment produced by the process of the present invention, the vehicle therefor is not specially limited. The vehicle may contain an adjuvant or an extender pigment.

The vehicle for the gravure ink is composed of a resin and a solvent. Examples of the resin include gum rosin, wood rosin, tall oil rosin, lime rosin, rosin ester, a maleic resin, a polyamide resin, a vinyl resin, cellulose nitrate, cellulose acetate, ethyl cellulose, chlorinated rubber, cyclized rubber, an ethylene-vinyl acetate copolymer resin, a polyurethane resin, a polyester resin, an alkyd resin, an acrylic resin, gilsonite, dammar, shellac, etc., a mixture of at least two of these, and a water-soluble resin or emulsion resin prepared by solubilizing any one of the above resins or the mixture in water. Examples of the solvent include a hydrocarbon, an alcohol, a ketone, an ether alcohol, an ether, an ester and water.

The vehicle for the offset ink is composed of a resin, a plant oil and a solvent. Examples of the resin include a rosin-modified phenol resin, a petroleum resin, an alkyd resin and a resin obtained by modifying any one of these resins with a drying oil. Examples of the plant oil include linseed oil, tung oil and soybean oil. Examples of the solvent include n-paraffin, I-paraffin, aromatic, naphthene, $\alpha$-olefin and water.

The vehicle for the coating composition is composed of a resin and a solvent. Examples of the resin include an acrylic resin, an alkyd resin, an epoxy resin, chlorinated rubber, vinyl chloride, a synthetic resin emulsion, a silicon resin, a polyurethane resin, a polyester resin, a melamine resin, a urea resin, a mixture of at least two of these, or a water-soluble resin or emulsion resin prepared by solubilizing any one of the above resins in water. Examples of the solvent include a hydrocarbon, an alcohol, a ketone, an ether alcohol, an ether, an ester and water.

The gravure ink composition, the offset ink composition or the coating composition, provided by the present invention, can be produced by mixing or dispersing the above copper phthalocyanine pigment or a mixture of the copper phthalocyanine pigment with a phthalocyanine derivative with/in the corresponding vehicle with a dispersing apparatus. The dispersing apparatus includes a dissolver, a high-speed mixer, a homomixer, a kneader, a flusher, a roll mill, a sand mill and an attritor.

EXAMPLES

The present invention will be explained concretely with reference to Examples and Comparative Examples hereinafter. In the Examples, there was used, as a standard pigment, a $\beta$ type copper phthalocyanine pigment prepared from a crude copper phthalocyanine by a solvent salt milling method (a common salt in five times amount). The aspect ratio of particles of the pigment was about 2.0. The aspect ratio of primary crystal was calculated from a photograph taken with a transmission electron microscope.

The $\alpha$ ratio and the diameter of a crystallite were obtained from an X-ray diffraction profile.

The $\alpha$ ratio was calculated by the following expression.

$\alpha$ ratio/%={(integrated intensity at a diffraction angle of 14.3°–16.0°)–(integrated intensity at a diffraction angle of 13.8°)}×100/{(total of integrated intensities at diffraction angles of 12.2°, 14.3°31 16.0°, and 18.0°)–(integrated intensity at a diffraction angle of 13.8°)}

The diameter of a crystallite was calculated by the Scherrer expression from an integral width value based on diffraction planes of $\beta$ (001), $\beta$ (200) and $\beta$ (010) at diffraction angles of 7.0°, 10.5° and 18.5°.

Example 1

500 parts by weight of a crude copper phthalocyanine having a purity of 99%, based on a sulfuric acid dissolution method, and a primary crystal diameter of 1 to 10 $\mu$m was charged into a 5-liter dry-type attritor, and the crude copper phthalocyanine was milled at 115° C. for 1 hour, to obtain a milled product containing 15% of $\alpha$ type crystals. 50 parts by weight of the milled product was added to 100 parts by weight of isobutanol and 50 parts by weight of water, and the mixture was stirred with a high-speed mixer at 80° C. for 1 hour. It was confirmed that the $\alpha$ ratio decreased to 1% or less by the above pre-mixing procedure. The confirmation of the $\alpha$ ratio was carried out using a sample obtained by adding the slurry after the pre-mixing treatment to an equal amount of methanol, filtering the resultant mixture with a filter paper No. 5C supplied by TOYO ROSHI KAISHA, LTD., further dashing 3 times amount of isobutanol over a material remaining on the filter paper to wash the material, and air-drying the washed material. Then, 200 parts by weight of isobutanol and 100 parts by weight of water were further added, and the resultant mixture was circulatively dispersed with an Eiger mill having a mill volume of 200 ml using 0.8 mm $\phi$ steal beads at 50° C. for 1 hour. Then, 200 parts by weight of water was added, and the resultant mixture was distilled and then spray-dried, to obtain a pigment. The aspect ratio of particles of the pigment was 2.3, and the $\alpha$ ratio was 1% or less. The crystallite diameter was 23 nm in the direction perpendicular to a monoclinic $\beta$ (200) plane, it was 26 nm in the direction perpendicular to a $\beta$ (001) plane and it was 15 nm in the direction perpendicular to a $\beta$ (010) plane. The pigment was compared with a standard pigment. An ink of the pigment of the present Example had quality equivalent to the quality of an ink of the standard pigment in terms of tinting strength, gloss, fluidity, etc., and the hue thereof was greenish.

Example 2

500 parts by weight of a crude copper phthalocyanine having a purity of 97%, based on a sulfuric acid dissolution method, and a primary crystal diameter of 1 to 10 $\mu$m was charged into a 5-liter dry-type attritor, and the crude copper phthalocyanine was milled at 90° C. for 1 hour, to obtain a milled product containing 27% of $\beta$ type crystals. 50 parts by weight of the milled product was added to 150 parts by weight of isobutanol, 50 parts by weight of water and 0.7 part by weight of PELEX OT-P (anionic surfactant supplied by KAO Corporation) and the mixture was stirred with a high-speed mixer at 80° C. for 1.5 hours. It was confirmed that the $\alpha$ ratio decreased to 1% or less. Then, 225 parts by weight of isobutanol and 75 parts by weight of water were further added, and the resultant mixture was circulatively dispersed with an Eiger mill having a mill volume of 200 ml using 0.8 mm $\phi$ steal beads at 60° C. for 1 hour. Then, 260 parts by weight of water was added, and the resultant mixture was distilled and then spray-dried, to obtain a pigment. The aspect ratio of particles of the pigment was 2.7, and the $\alpha$ ratio was 1% or less. The crystallite diameter was 23 nm in the direction perpendicular to a monoclinic $\beta$ (200)

plane, it was 25 nm in the direction perpendicular to a β (001) plane and it was 14 nm in the direction perpendicular to a β (010) plane. The pigment was compared with a standard pigment. An ink of the pigment of the present Example had quality equivalent to the quality of an ink of the standard pigment in terms of tinting strength, gloss, fluidity, etc., and the hue thereof was greenish.

Example 3

500 parts by weight of a crude copper phthalocyanine having a purity of 98%, based on a sulfuric acid dissolution method, and a primary crystal diameter of 1 to 10 μm was charged into a 5-liter dry-type attritor, and the crude copper phthalocyanine was milled at 140° C. for 1 hour, to obtain a milled product containing 8% of α type crystals. 50 parts by weight of the milled product was added to 75 parts by weight of isobutanol, 175 parts by weight of water and 0.5 part by weight of ESTER GUMAT (rosin ester type resin supplied by Arakawa Chemical Industries, Ltd.), and the mixture was stirred with a high-speed mixer at 80° C. for 1 hour. It was confirmed that the α ratio decreased to 1% or less. Then, 175 parts by weight of isobutanol and 75 parts by weight of water were further added, and the resultant mixture was circulatively dispersed with an Eiger mill having a mill volume of 200 ml using 0.8 mm φ steal beads at 60° C. for 1.5 hours. Then, 75 parts by weight of water was added and the resultant mixture was distilled and then spray-dried, to obtain a pigment. The aspect ratio of particles of the pigment was 2.1, and the α ratio was 1% or less. The crystallite diameter was 22 nm in the direction perpendicular to a monoclinic β (200) plane, it was 26 nm in the direction perpendicular to β (001) plane and it was 16 nm in the direction perpendicular to a β (010) plane. The pigment was compared with a standard pigment. An ink of the pigment of the present Example had quality equivalent to the quality of an ink of the standard pigment in terms of tinting strength, gloss, fluidity, etc., and the hue thereof was greenish.

Example 4

500 parts by weight of a crude copper phthalocyanine having a purity of 99%, based on a sulfuric acid dissolution method, and a primary crystal diameter of 1 to 10 μm was charged into a 5-liter dry-type attritor, and the crude copper phthalocyanine was milled at 115° C. for 1 hour, to obtain a milled product containing 15% of α type crystals. 50 parts by weight of the milled product was added to 75 parts by weight of ethyl cellosolve and 75 parts by weight of water, and the mixture was stirred with a high-speed mixer at 80° C. for 1 hour. It was confirmed that the α ratio decreased to 1% or less. Then, 150 parts by weight of ethyl cellosolve and 150 parts by weight of water were further added, and the resultant mixture was circulatively dispersed with an Eiger mill having a mill volume of 200 ml using 0.8 mm φ steal beads at 50° C. for 1 hour. Then, 70 parts by weight of water was added and the resultant mixture was distilled and then spray-dried, to obtain a pigment. The aspect ratio of particles of the pigment was 2.3, and the α ratio was 1% or less. The crystallite diameter was 19 nm in the direction perpendicular to a monoclinic β (200) plane, it was 24 nm in the direction perpendicular to a β (001) plane and it was 18 nm in the direction perpendicular to a β (010) plane. The pigment was compared with a standard pigment. An ink of the pigment of the present Example had quality equivalent to the quality of an ink of the standard pigment in terms of tinting strength, gloss, fluidity, etc., and the hue thereof was greenish.

Comparative Example 1

500 parts by weight of a crude copper phthalocyanine having a purity of 93%, based on a sulfuric acid dissolution method, and a primary crystal diameter of 1 to 10 μm was charged into a 5-liter dry-type attritor, and the crude copper phthalocyanine was milled at 130° C. for 1 hour, to obtain a milled product containing 45% of α type crystals. 50 parts by weight of the milled product was added to 100 parts by weight of isobutanol and 50 parts by weight of water, and the mixture was stirred with a high-speed mixer at 80° C. for 2 hours. It was confirmed that the α ratio decreased to 1% or less. Then, 200 parts by weight of isobutanol and 100 parts by weight of water were further added, and the resultant mixture was circulatively dispersed with an Eiger mill having a mill volume of 200 ml using 0.8 mm φ steal beads at 50° C. for 1 hour. Then, 200 parts by weight of water was added and the resultant mixture was distilled and then spray-dried, to obtain a pigment. The aspect ratio of particles of the pigment was 4.0, and the α ratio was 1% or less. The crystallite diameter was 22 nm in the direction perpendicular to a monoclinic β (200) plane, it was 26 nm in the direction perpendicular to a β (001) plane and it was 16 nm in the direction perpendicular to a β (010) plane. The pigment was compared with a standard pigment. An ink of the pigment of the present Comparative Example was poor in terms of tinting strength, clarity and fluidity when compared with an ink of the standard pigment of the solvent salt milling method.

Comparative Example 2

500 parts by weight of a crude copper phthalocyanine having a purity of 98%, based on a sulfuric acid dissolution method, and a primary crystal diameter of 1 to 10 μm was charged into a 5-liter dry-type attritor, and the crude copper phthalocyanine was milled in the presence of 15 parts by weight of xylene at 120° C. for 1 hour, to obtain a milled product containing 3% of α type crystals. 50 parts by weight of the milled product was added to 75 parts by weight of isobutanol and 175 parts by weight of water, and the mixture was stirred with a high-speed mixer at 80° C. for 1 hour. It was confirmed that the α ratio decreased to 1% or less. Then, 175 parts by weight of isobutanol and 75 parts by weight of water were further added, and the resultant mixture was circulatively dispersed with an Eiger mill having a mill volume of 200 ml using 0.8 mm φ steal beads at 60° C. for 1.5 hours. Then, 75 parts by weight of water was added and the resultant mixture was distilled and then spray-dried, to obtain a pigment. The aspect ratio of particles of the pigment was 2.0, and the α ratio was 1% or less. The crystallite diameter was 22 nm in the direction perpendicular to a monoclinic β (200) plane, it was 27 nm in the direction perpendicular to a β (001) plane and it was 16 nm in the direction perpendicular to β (010) plane. The pigment was compared with a standard pigment. An ink of the pigment of the present Comparative Example was poor in terms of tinting strength, clarity and gloss when compared with an ink of the standard pigment of the solvent salt milling method.

Effect of the Invention

The present invention can produce the β type copper phthalocyanine pigment of which the primary crystal aspect ratio is small. Further, the above β type copper phthalocyanine pigment has quality, in terms of tinting strength, gloss, fluidity, etc., equivalent to the quality of a pigment of the generally-used solvent salt milling method, but gives less loading to equipment and environment since salts as a milling assistant and a high-boiling solvent having a high COD value are not used.

What is claimed is:

1. A process for the production of a β type copper phthalocyanine pigment having an average primary crystal diameter of 80±40 nm and a primary crystal aspect ratio of 2.0±1.0 and having a crystallite diameter of 22±5 nm in the direction perpendicular to a monoclinic β (200) plane, a crystallite diameter of 27±5 nm in the direction perpendicular to a β (001) plane and a crystallite diameter of 15±5 nm in the direction perpendicular to a β (010) plane, which process comprises, the step (A) of dry-milling a crude copper phthalocyanine having a purity, based on a sulfuric acid dissolution method, of 97 to 100% and a primary crystal diameter of 0.5 to 100 μm at a temperature of 180 to 50° C., to prepare an α/β mixed crystal type copper phthalocyanine having an α ratio of 5 to 35%, and the step (B) of treating the dry-milled product obtained in the step (A) in a water-miscible organic solvent.

2. The process according to claim 1, where in the water-miscible organic solvent is a liquid mixed with water.

3. The process according to claim 1, wherein, in the step (B), the dry-milled product is treated with a bead mill.

4. A printing ink or coating composition comprising a β type copper phthalocyanine pigment produced by the process recited in claim 1 and a vehicle.

* * * * *